Jan. 21, 1964 W. D. HAMMOND 3,118,962
ADJUSTABLE TEMPLE FOR EYEGLASSES
Filed Feb. 28, 1961 2 Sheets-Sheet 1
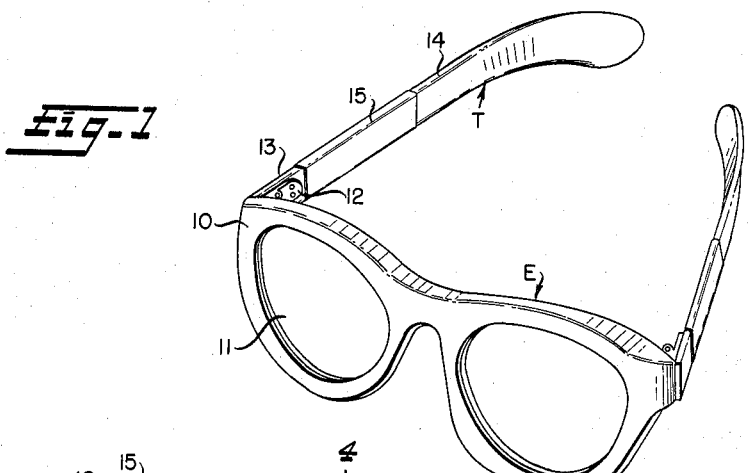
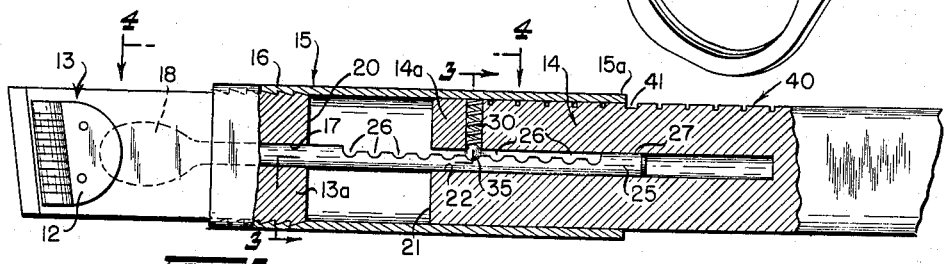
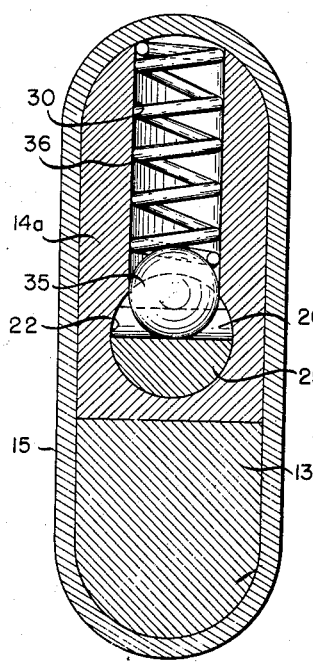
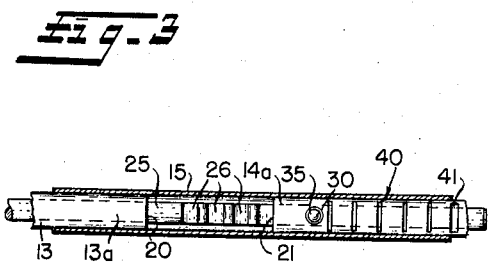
INVENTOR
William D. Hammond
BY *Shlesinger & Shlesinger*
ATTORNEYS Jan. 21, 1964 W. D. HAMMOND 3,118,962
ADJUSTABLE TEMPLE FOR EYEGLASSES
Filed Feb. 28, 1961 2 Sheets-Sheet 2
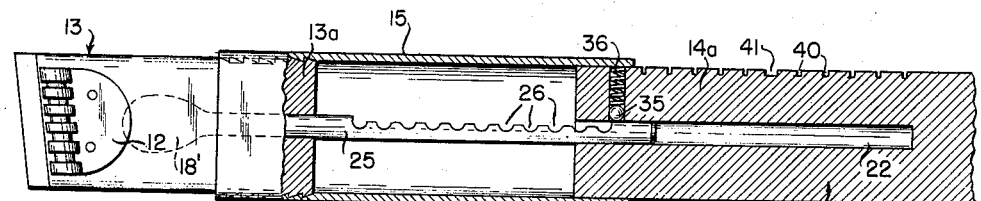
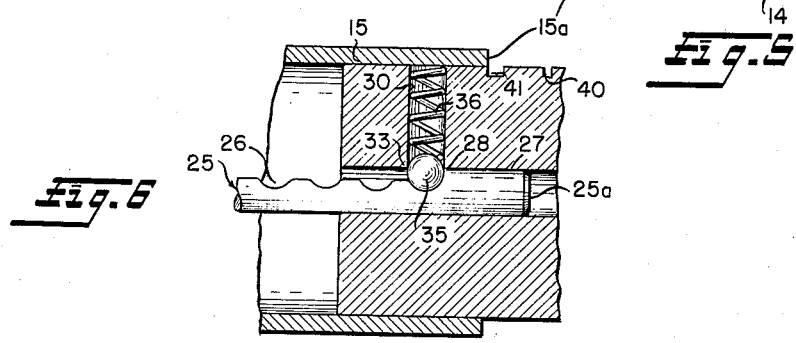
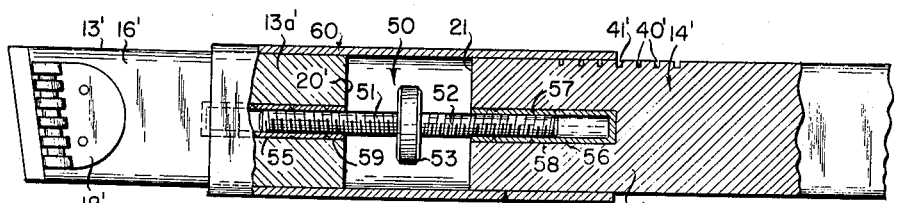
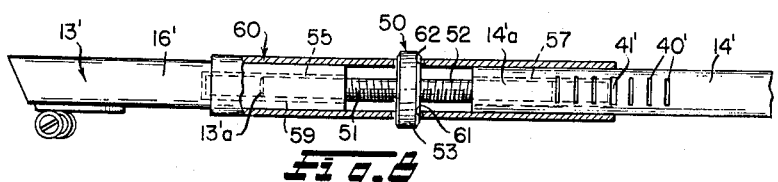
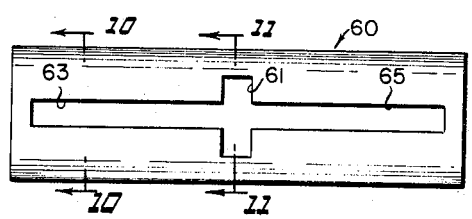
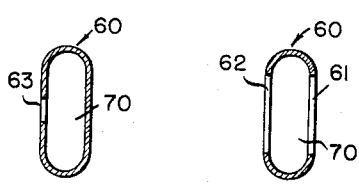
INVENTOR
William D. Hammond
BY *Shlesinger + Shlesinger*
ATTORNEYS

United States Patent Office 3,118,962
Patented Jan. 21, 1964

3,118,962
ADJUSTABLE TEMPLE FOR EYEGLASSES
William D. Hammond, Mexico City, Mexico (% Rotary Engineering de Mexico, Ave. Juarez 119–32, Mexico City, Mexico)
Filed Feb. 28, 1961, Ser. No. 92,301
7 Claims. (Cl. 88—52)

This invention pertains to an adjustable temple bar construction for an eyeglass frame.

It is the general object of the present invention to provide an adjustable temple bar for eyeglass frames which is longitudinally adjustable in small increments and which may readily be adjusted by the user.

A further object of the invention is to provide a device of this character which is compact and sturdy and does not detract from the overall appearance of the temple bar.

Another object is to provide a telescoping intermediate sleeve for slidable telescoping adjustment of the members.

A still further object is to provide an interior adjustable mechanical connection between longitudinally moveable temple bar elements which also assists in imparting rigidity to the temple bar construction.

A still further object is to provide a partially hidden indicating means which will show the amount of incremental adjustment of the temple bar members.

Other objects and advantages reside in the details of construction, arrangement, in combination of the various parts of my invention, as hereinafter more fully set forth, specifically pointed out in my claims, and illustrated in the accompanying drawings, in which:

FIGURE 1 is a perspective view of my eyeglass frame,

FIGURE 2 is a side view of an adjustable temple bar of my invention, with a central portion cut away to show a dowel and spring biased retent assembly, FIGURE 3 is an enlarged cross-sectional view of the temple bar of FIGURE 2 along the line 3—3, FIGURE 4 is a top view of FIGURE 2, with the top of the sleeve cut away, and shows an indicating scale used in making adjustments of the temple bar length, FIGURE 5 is a side view of the temple bar construction of FIGURE 2, with the parts cut away to show the disposition thereof during assembly, FIGURE 6 is an enlarged fragmentary cut away view of the dowel and detent assembly of FIGURE 2 showing the members in locked position, FIGURE 7 is a side cut away view of another modification of my temple bar assembly in which a screw with a knurled button is used as the adjusting means, FIGURE 8 is a cut away top view of the modification of FIGURE 7, FIGURE 9 is plan view of the intermediate sleeve member used in the structure shown in FIGURES 7 and 8, FIGURES 10 and 11 are cross-sectional views along the lines 10—10 and 11—11 of FIGURE 9.

Referring to the drawings in detail, FIGURE 1 shows a spectacle frame having an eye piece E of the usual construction and having a frame 10 with openings for lenses 11. Adjustable temple bars T are hingedly connected to the eye frame E by means of hinges 12.

As best illustrated in FIGURE 2, the adjustable temple bars have a connecting base member 13 on which hinge 12 is mounted, and an ear piece 14 which is slidably mounted with respect to member 13 by means of sleeve 15. The temple bar base member 13 has an end 13a which fits into the sleeve 15 and is rigidly held therein by the gripping action of serration 16 of the sleeve member. The other end of the sleeve is telescopically mounted over the end 14a of the ear piece member 14.

The sleeve is of the same cross-sectional configuration as the temple bar members and is preferably made of metal. A finish which matches that of the other temple bar members may be applied to the sleeve, for example, by anodyzing. The sleeve is positioned as close as possible to the hinged end of the base member 13 to avoid catching of the hair of the person wearing spectacles.

In FIGURES 2 through 6 the incremental adjustment of the members with respect to each other is produced by the use of a dowel and detent mechanism.

The dowel 25 is rigidly mounted in the base member 13 preferably, and slidably received within the bore 22 in the ear piece member 14.

An enlarged head 18 on the embedded end of the dowel may be provided for more rigid joinder of the members. Head 18 may be either of a circular or rectangular cross-sectional configuration, the latter shape being produced by pinching the end of the dowel. Assembly of the dowel may also be accomplished in a two step operation in which the end of the dowel is inserted in longitudinal bore 17 after fabrication of the base member 13.

Flat opposed end faces 20 and 21 are respectively provided on the opposed end portions 13a and 14a of the base and ear piece members. The free end 27 of the dowel member, as clearly shown in FIGURE 2 is slidably positioned in a longitudinal bore 22 which extends inward from the end face 21 of the ear piece member 14. There is a close smooth sliding fit between the bore face and the periphery of the dowel the clearance being in the order of two thousandths of an inch. A spring biased ball 32 engages one of a plurality of equally spaced indentations 26 adjacent the free end 27 of dowel member 25 to hold the members in position at a desired length.

With respect to the section of the dowel containing the indentations 26, it should be noted that the surface is under cut so that a series of low shoulders 26a is formed between the indentations 26. This construction permits the ball 35 to be moved from one indentation to another without difficulty.

The details of the ball mounting are shown in FIGURE 3 as well as the general cross-sectional shape of the sleeve and temple bar members. Sliding clearance between sleeve 15 and the end portion 14a is in the order of five thousandths (.005) of an inch and permits an acceptable slip fit while preventing excessive play between the members. This clearance, of course, will vary with the materials of the frame and the fit desired.

The detent arrangement shown in FIGURES 2 through 6 is a spring biased ball arrangement in which a bore 30 disposed normally to the dowel receiving bore 22 and connected therewith holds a ball 35 and a helical spring 36. The spring is positioned entirely within the bore and engages the ball 35 to press it outwardly and into one of the indentations or pockets 26 on the dowel 25. The ball when seated in a pocket is extended about half way out of the bore 30.

The end of the dowel in these figures, it will be noted extends outwardly beyond the end 15a of the sleeve member. This arrangement as best shown in FIGURES 5 and 6 will facilitate assembly of the detent mechanism by permitting the ball and spring detent to be mounted without difficulty. The end face 25a of the dowel member as shown in FIGURE 6 extends out beyond the end of the sleeve 15a a sufficient distance so that the dowel provides a stop means which is very useful during assembly. This particular feature is best illustrated in FIGURES 5 and 6.

In FIGURE 5 the ear piece member 14 is shown during assembly immediately after the spring 36 has been inserted in the bore 30 and pressed under the end of sleeve 15. The land portion of the dowel between shoulder 28 and end face 25a provides a stop means which keeps the ball and spring from dropping through the bore 30 and simultaneously gives a smooth surface upon which the ball 35 may slide until it reaches the outermost pocket of the dowel.

FIGURE 6 shows a fragmentary view of the dowel and detent assembly immediately after seating of the ball 35 in the outermost pocket adjacent the shoulder 28. This position may be termed a locked position inasmuch as once the ball 35 is passed beyond the shoulder 28 the ear piece member 14 cannot be disengaged from the sleeve member 15. This effect is achieved by a locking or wedging action between shoulder 28, ball 35, and the edge 33 adjacent bore 30.

It will readily be seen that the dowel construction as shown in these figures will provide a simple and easily adjusted means for varying temple bar length and also be a means for simple assembly and automatic locking of the members as a unit.

The use of a scale 40 in conjunction with the dowel and detent mechanism of FIGURES 2 through 6 is also shown. Longitudinally spaced markings are provided on the top surface of ear piece member 14 adjacent its opposed end 14a to aid in adjusting the length of the temple bar member. The scale is progressively uncovered when the temple bar length is extended. The markings are spaced apart the same distance as that between the centers of the dowel member pockets. The mid position of length adjustment is indicated by a special enlarged marking 41. This enlarged marking permits reference by the user to a central or mid position. FIGURES 2 and 4 and FIGURES 7 and 8 show the members arranged at mid position with the enlarged marking immediately adjacent the end of the sleeve. In FIGURES 2 and 4 enlarged marking 41 is immediately adjacent the end 15a of sleeve member 15.

FIGURES 7 and 8 show another modification of the adjustable bar assembly utilizing a central movable collar 60 and a central screw member 50 with a knurled button for adjusting the length of the temple bar.

This modification shows a rotatable central screw 50 which engages threaded sleeves 55 and 56 as shown in FIGURE 7. Screw member 50 has a right handed threaded portion 51 threadedly engaging sleeve 55 of base portion 13', and a left handed threaded portion 52 threadedly engaging sleeve 56 of the ear piece member 14'. The central portion of the screw 50 has a knurled button 53 between threaded portions 51 and 52 which is used to manually adjust the length of the temple bar when rotated by the fingers of the user.

The threaded sleeve members 55 and 56 are preferably tapped metal inserts which are secured at bores 58 and 59. The inserts may be held in position within the bores by means of special gripping configurations 57, or by serrations or roughened areas cut in the outersurface of the inserts. This same arrangement may be used to hold a dowel without an enlarged head portion within the base member 13.

Details of the construction of sleeve 60 are shown in FIGURES 9, 10 and 11. The sleeve is oval shaped in cross-section and has two vertical slots 61 and 62 in each of the side walls to permit the knurled button 53 to protrude therethrough as shown in FIGURE 8. The inner side of the sleeve as shown in FIGURE 9 has an elongated longitudinal slot 63 extending on one side of slot 61 and a similar elongated slot 65 in alignment with longitudinal slot 63 and extending on the other side of slot 61. These slots are of sufficient dimension to permit passage of the adjusting screw 50 laterally through the outline they form and into the interior portion 70 of the sleeve 60.

With respect to the operation of the modification of FIGURES 7 and 8, it should be noted that the assembly is adjusted for mid position and that the sleeve is in telescopically removable engagement with both the base and ear piece members. This arrangement permits the sleeve to be moved closer to the hinge end of the base member 13' so that the movable parts are cleared of any possible interference with the hair of the wearer and the wearer may readily adjust the length of the temple bar while the frame is being worn by the user.

While the invention has been described in connection with different embodiments thereof, it will be understood that it is capable of further modification, and this application is intended to cover any variations, uses or adaptations of the invention following, in general, the principles of the invention and including such departures from the present disclosure as come within the known or customary practice in the art to which the invention pertains, and as may be applied to the essential features hereinbefore set forth and as fall within the scope of the appended claims.

I claim:

1. An adjustable temple bar for an eyeglass frame comprising a base member adapted at one end to be hingably connected to an eyepiece frame, an ear piece member axially aligned with the other end of the base member, both members having a similar cross-sectional shape and having two substantially flat parallel sides, a rigid thin walled sleeve of similar cross-sectional shape as said members which is fitted over the opposed ends of said members to provide a rigid bridge to hold the members in axial alignment, said sleeve being integral with one member and telescopically engaging the exterior surface of the other member in a close sliding fit to permit relative axial movement of the base and ear piece members while holding them in axial alignment, the opposed ends of the base and ear piece members each having an end face which has a longitudinally extending bore, both of said bores being in axial alignment, a dowel member which has a substantial portion of each of its ends within each of said bores and bridges the gap between said end faces, said dowel being rigidly held in one bore and being in close sliding fit within the other bore, said dowel acting to impart rigidity to the connection between the base and ear piece members, a plurality of axially spaced holding elements on said dowel adjacent its free end, and detent means which engages one of said holding elements and upon relative axial movement of said base and ear piece members moves successively from one holding element to another, to thereby hold the said members in a desired position, so that the overall length of the temple bar may be incrementally adjusted.

2. The adjustable temple bar construction of claim 1 wherein the sleeve is rigidly connected to the base member and the detent is a spring biased ball mounted in the ear piece member which engages the dowel.

3. In an eyeglass frame construction as set forth in claim 2 wherein the ear piece member has a bore adjacent its opposed end for receiving said ball and its biasing spring and which opens into the longitudinal bore at one end, said bore being of slightly greater diameter than the ball and spring members.

4. In an eyeglass frame construction, an adjustable temple bar comprising a base member adapted to be hingably connected to an eyepiece frame, an ear piece member axially aligned with a base member, both members having a similar cross-sectional shape and having two substantially flat parallel sides and a thin walled sleeve member which fits over the opposed ends of the members, one end of the sleeve being connected rigidly to the base member and the other end of the sleeve telescopically engaging the opposed end of the ear piece member in a close sliding fit, the sleeve member being of sufficient length to remain in telescopic engagement at the full extended length of the temple bar, axially aligned longitudinal bores extending inwardly from the opposed end of each of said members, a dowel member fixed in the bore of the base member and having a free end which extends toward the other end of the sleeve, the free end of the dowel member fitting into the bore in the ear piece member and having a number of equally spaced indentations in the surface thereof, an open ended bore connecting the outer surface of the ear piece member with the dowel receiving bore therein, the open ended bore being disposed in a substantially perpendicular direction to that of the dowel receiving bore, a ball positioned in the open ended bore and having part thereof seated in one of the indentations on the dowel, and a spring in said open ended bore engaging the ball at one end and the inner surface of the sleeve adjacent to the bore opening, whereby the ball is urged into seating engagement with the indentation on the dowel.

5. In an eyeglass frame construction, an adjustable temple bar comprising a base member adapted to be hingably connected to an eyepiece frame, an ear piece member axially aligned with the base member both members having a similar cross-sectional shape and having two substantially flat parallel sides and a thin walled sleeve member which fits over the opposed ends of the members, one end of the sleeve being rigidly connected to one of the members and the other end of the sleeve telescopically mounted in close sliding fit on the opposed end of the other member, said members at the opposed ends thereof having an end face and a bore extending longitudinally from the end face, both of said bores in axial alignment, a dowel member rigidly fastened in the bore of one of the members and at its free end having a close sliding fit with the bore of the other member, said dowel having a plurality of spaced indentations in the surface thereof, an open ended connecting bore in the dowel receiving member between the outer surface and the longitudinal receiving bore to receive a spring biased detent assembly, said dowel extending at its free end outwardly beyond the other end of the sleeve a sufficient length to provide a stop means for use during assembly which prevents the detent assembly from dropping through the connecting bore and into the dowel receiving bore.

6. An adjustable temple bar for an eyeglass frame construction comprising, a base member adapted to be hingably connected to an eyepiece frame, an earpiece member axially aligned with the base member, both members having a similar cross-sectional shape and having two substantially flat parallel sides and a thin walled sleeve which fits over the opposed ends of the members, one end of the sleeve being rigidly connected to one of the members and the other end of the sleeve telescopically mounted in close sliding fit on the opposed end of the other member, each of said members at the opposed ends having an end face and a bore extending longitudinally from said end face, both of said bores being in axial alignment, a dowel member being rigidly fastened at one end in the bore of one of the members and its other end having a close sliding fit within the bore of the other member, said dowel adjacent its free end having a section containing a plurality of equally spaced curved pockets, a spring biased ball carried by said other member for engaging one of said pockets, said section being under cut to provide low shoulders between said pockets whereby the ball may be moved from one pocket to another without difficulty.

7. An adjustable temple bar construction as set forth in claim 6 in which the dowel has a shoulder adjacent the end pocket to prevent the ear piece from being disengaged from the base member.

References Cited in the file of this patent

UNITED STATES PATENTS

| | | |
|---|---|---|
| 487,544 | Simon | Dec. 6, 1892 |
| 1,529,091 | Searles | Mar. 10, 1925 |
| 2,256,491 | Peck et al. | Sept. 23, 1941 |
| 2,283,120 | Malcolm | May 12, 1942 |
| 2,443,249 | Jackson | June 15, 1948 |
| 2,856,813 | Kudelko | Oct. 21, 1958 |
| 2,887,929 | Farmer | May 26, 1959 |

FOREIGN PATENTS

| | | |
|---|---|---|
| 636,761 | France | Jan. 16, 1928 |
| 303,716 | Great Britain | Jan. 10, 1929 |
| 303,730 | Great Britain | Jan. 10, 1929 |
| 802,839 | Great Britain | Oct. 15, 1958 |
| 363,886 | Italy | Oct. 15, 1938 |
| 403,149 | Italy | Apr. 6, 1943 |